Jan. 9, 1968  E. THIEL  3,362,274
APPARATUS FOR SHEARING ANIMALS
Filed Aug. 9, 1965  24 Sheets-Sheet 1

Inventor
ERWIN THIEL
By Young & Thompson
Attorneys

Jan. 9, 1968  E. THIEL  3,362,274
APPARATUS FOR SHEARING ANIMALS
Filed Aug. 9, 1965  24 Sheets-Sheet 6

Inventor
ERWIN THIEL
By Young & Thompson
Attorneys

Jan. 9, 1968   E. THIEL   3,362,274
APPARATUS FOR SHEARING ANIMALS
Filed Aug. 9, 1965   24 Sheets-Sheet 7
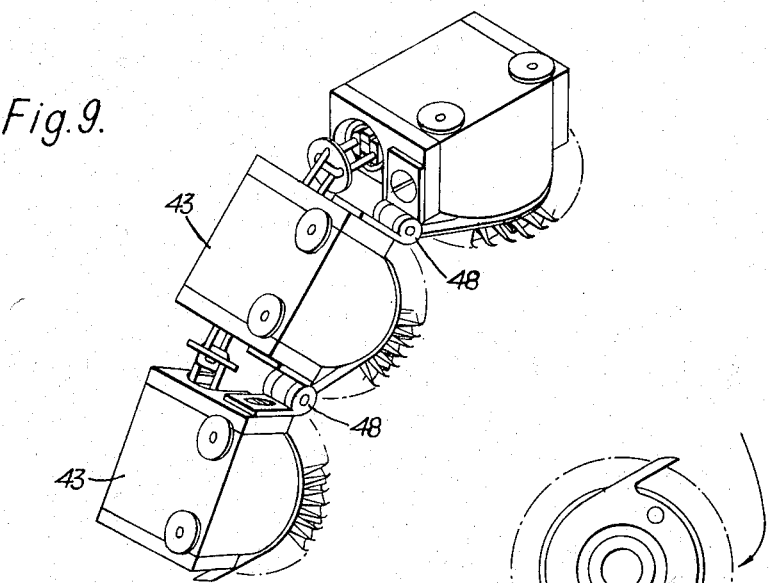
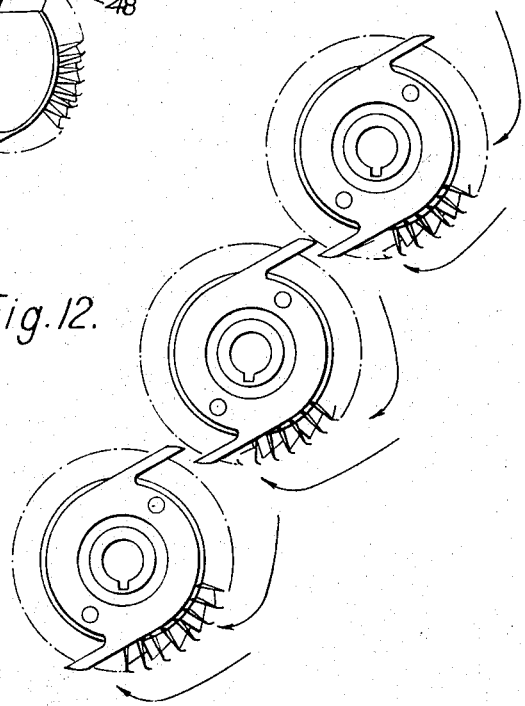
Inventor
ERWIN THIEL
By Young & Thompson
Attorneys

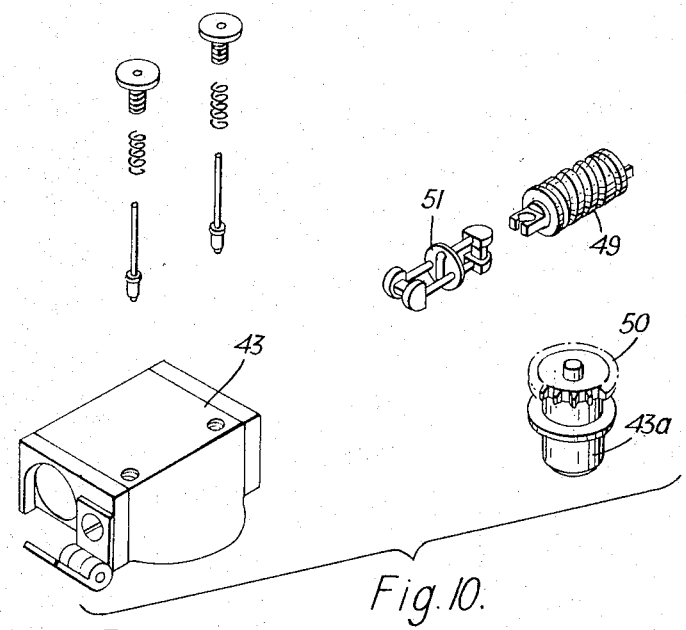
Fig. 10.
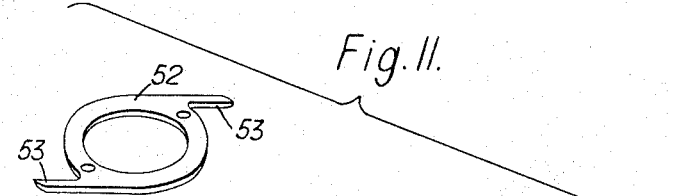
Fig. 11.
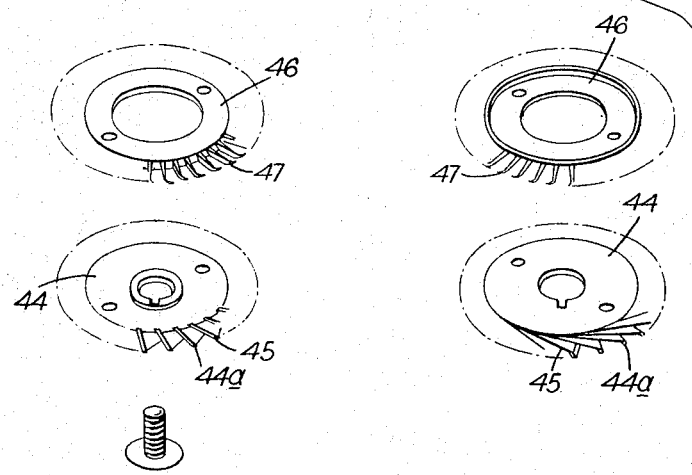

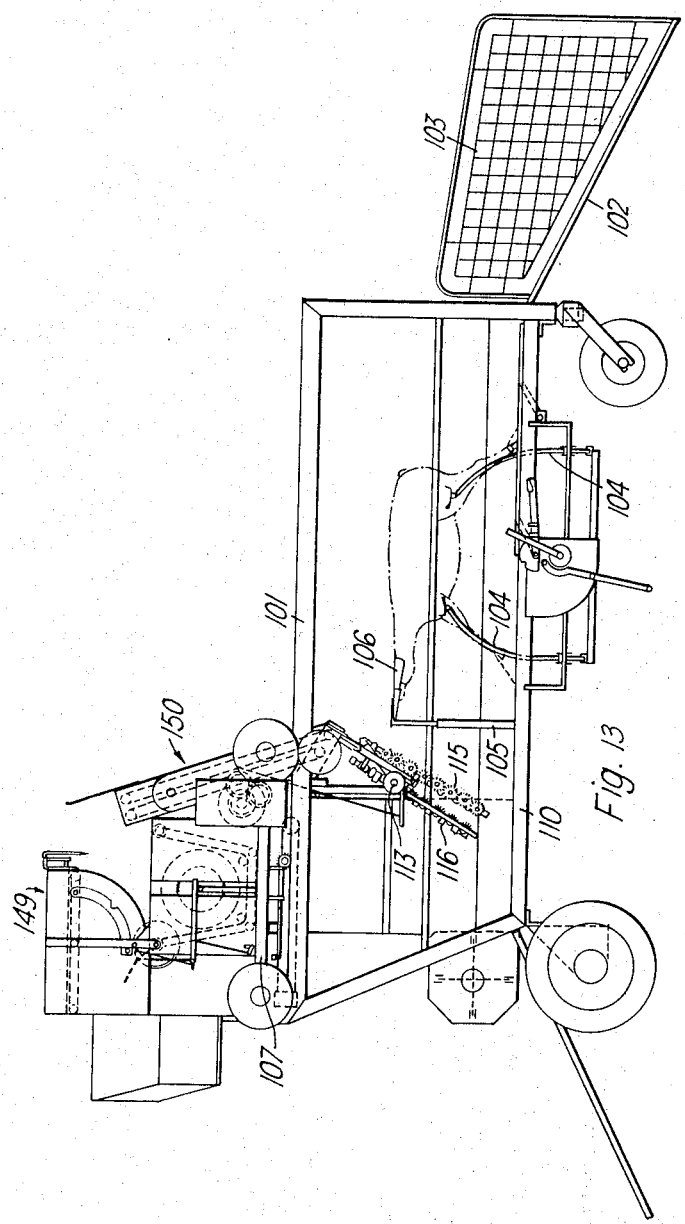

Inventor
ERWIN THIEL
By Young & Thompson
Attorneys

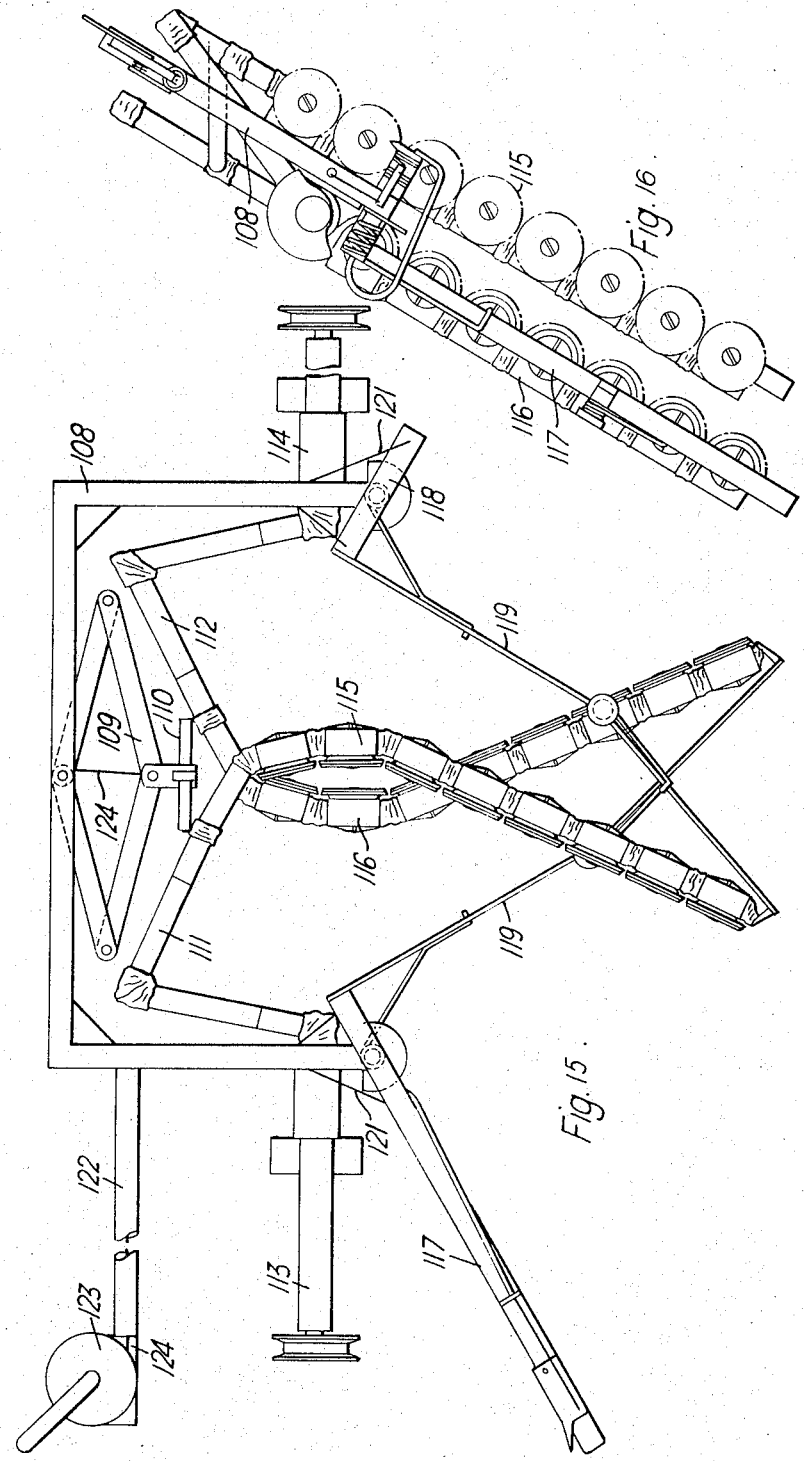

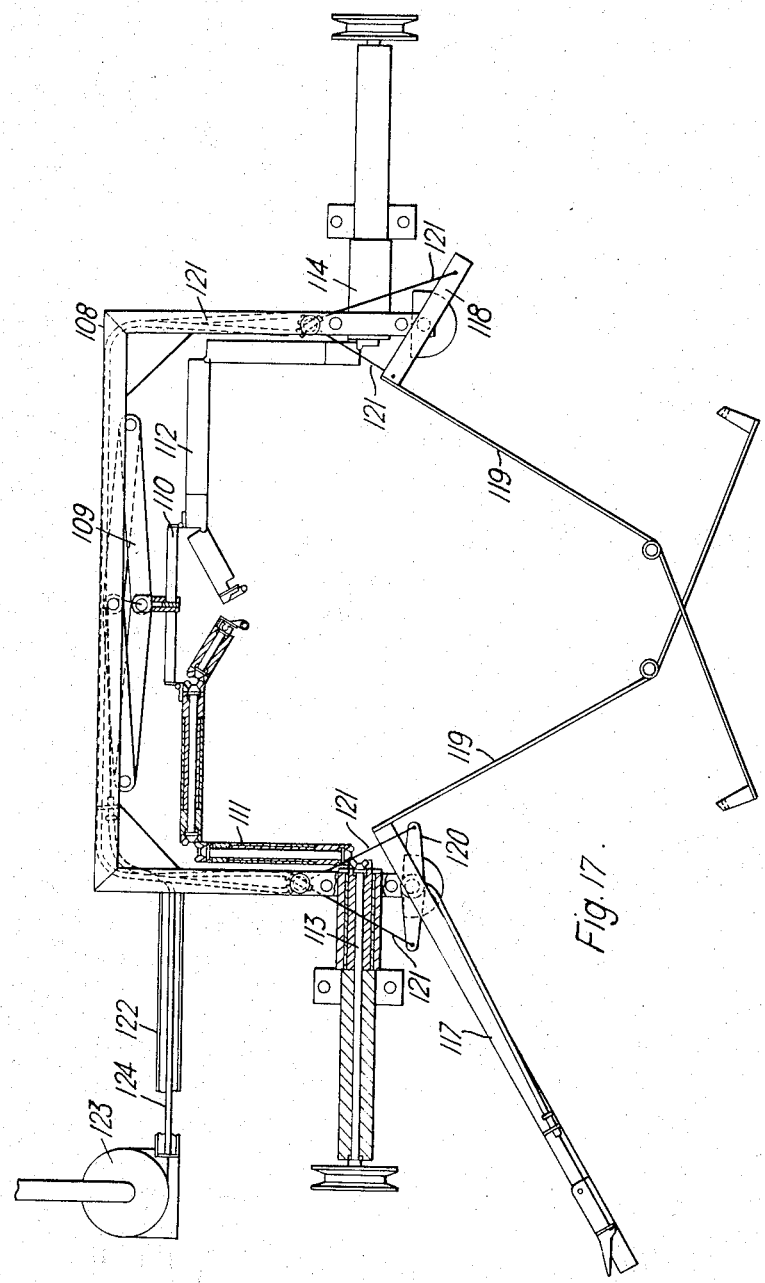

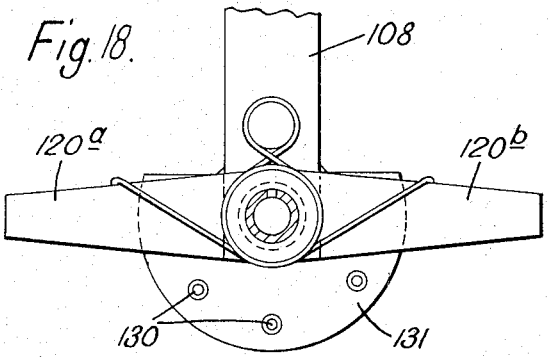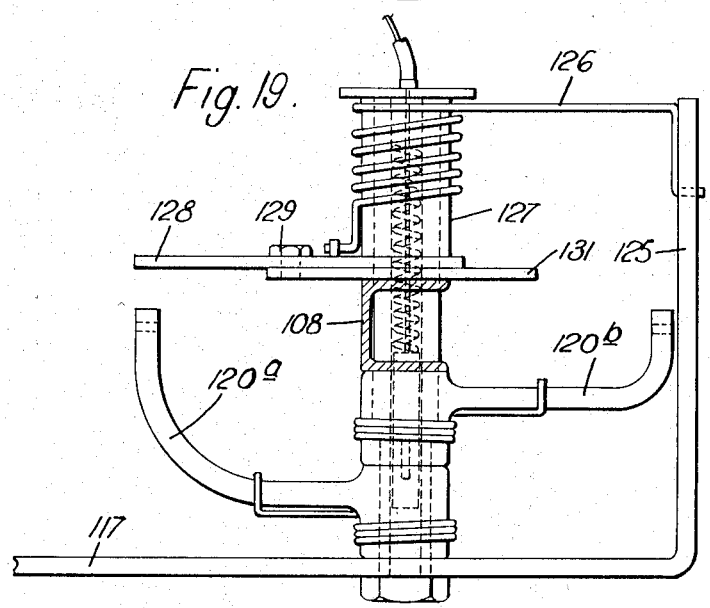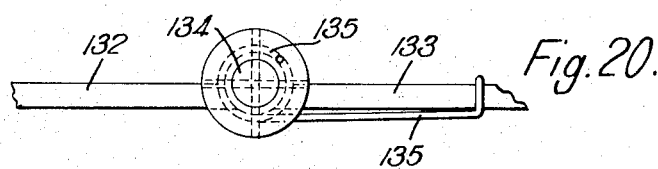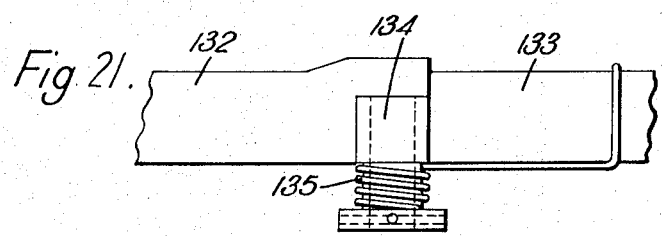

Jan. 9, 1968          E. THIEL          3,362,274
APPARATUS FOR SHEARING ANIMALS
Filed Aug. 9, 1965          24 Sheets-Sheet 14
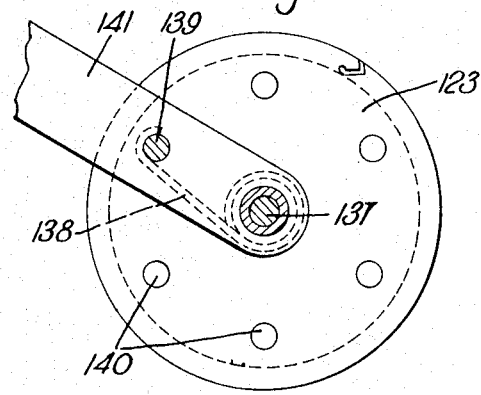
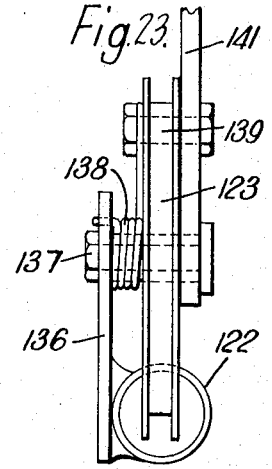
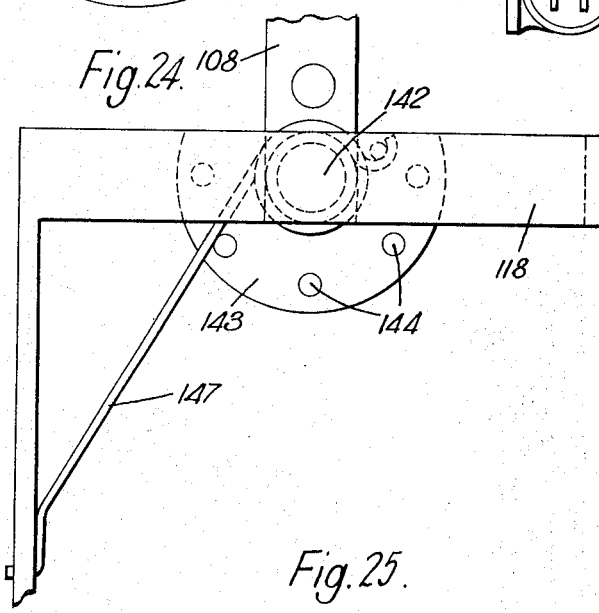
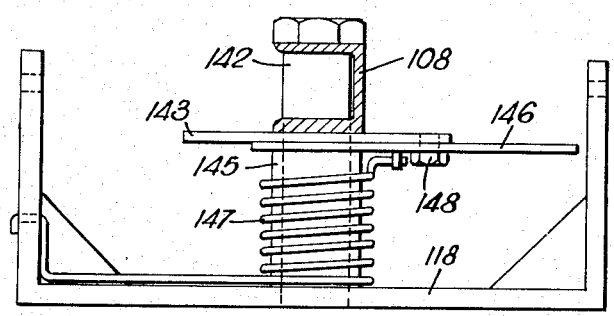
Inventor
ERWIN THIEL
By Young & Thompson
Attorneys Inventor
ERWIN THIEL
By Young & Thompson
Attorneys Jan. 9, 1968  E. THIEL  3,362,274
APPARATUS FOR SHEARING ANIMALS
Filed Aug. 9, 1965  24 Sheets-Sheet 16
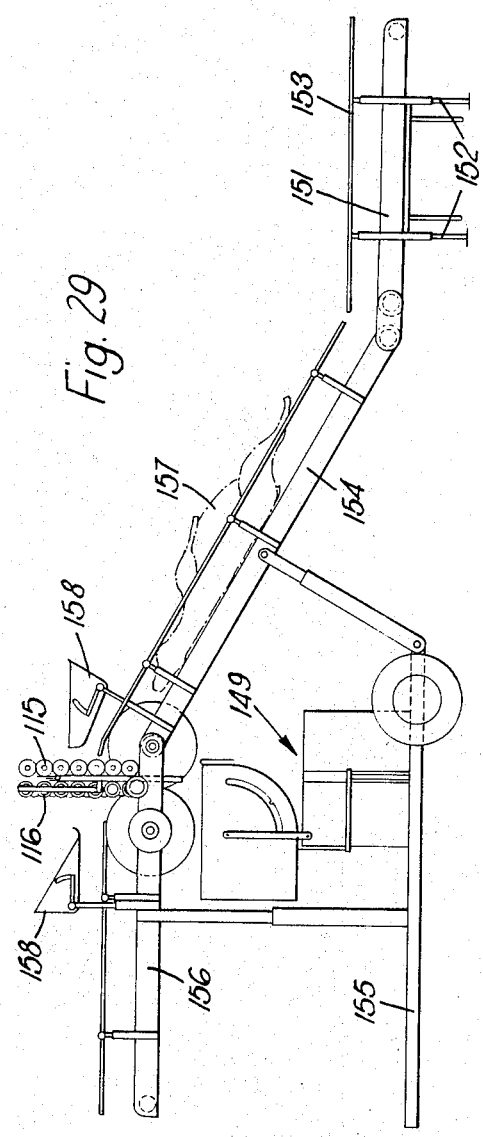
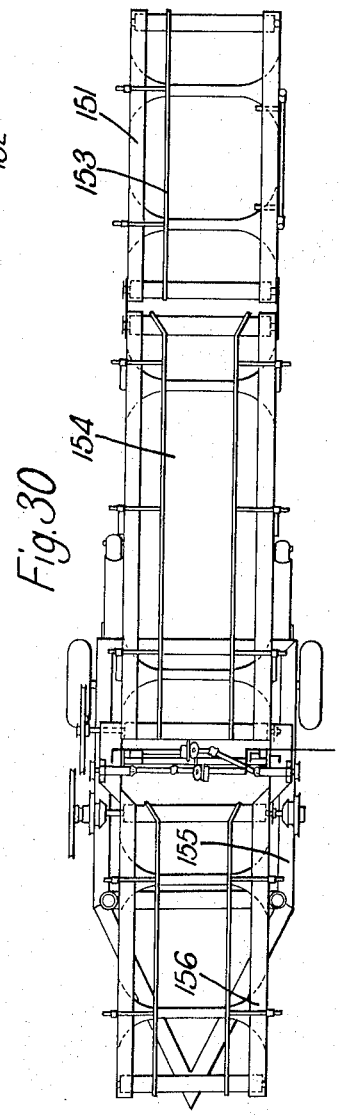
Inventor
ERWIN THIEL
By Young & Thompson
Attorneys

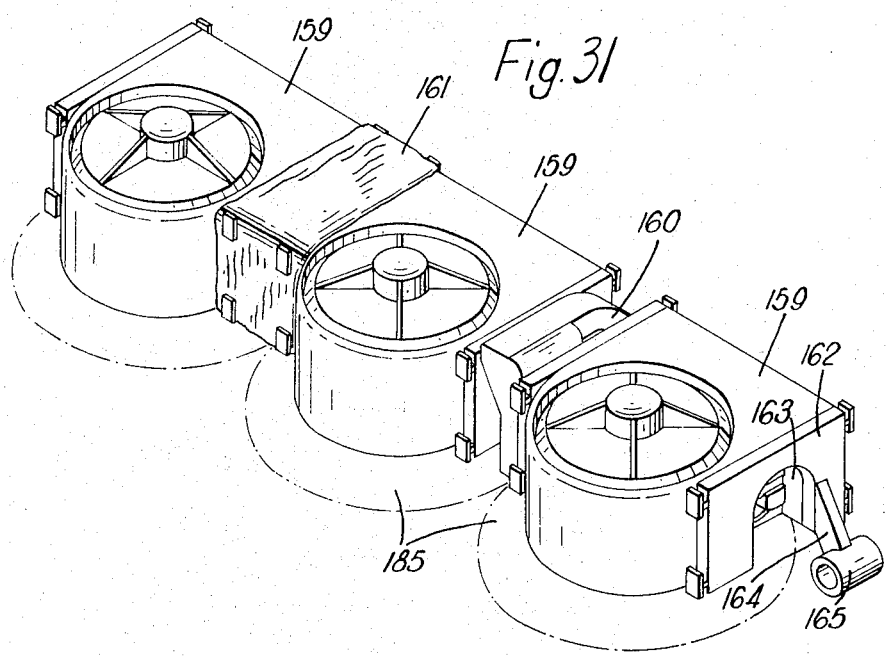
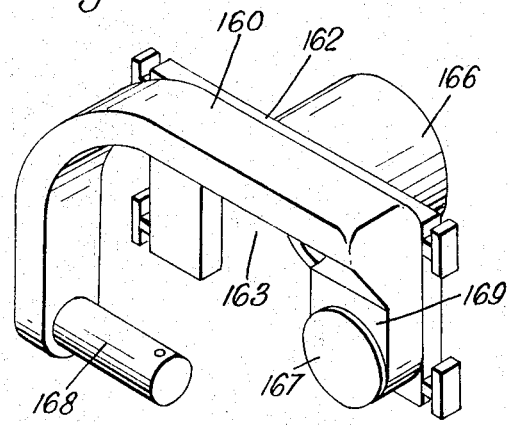

Jan. 9, 1968  E. THIEL  3,362,274
APPARATUS FOR SHEARING ANIMALS
Filed Aug. 9, 1965  24 Sheets-Sheet 18

Inventor
ERWIN THIEL
By Young & Thompson
Attorneys

Jan. 9, 1968     E. THIEL     3,362,274
APPARATUS FOR SHEARING ANIMALS
Filed Aug. 9, 1965     24 Sheets-Sheet 19
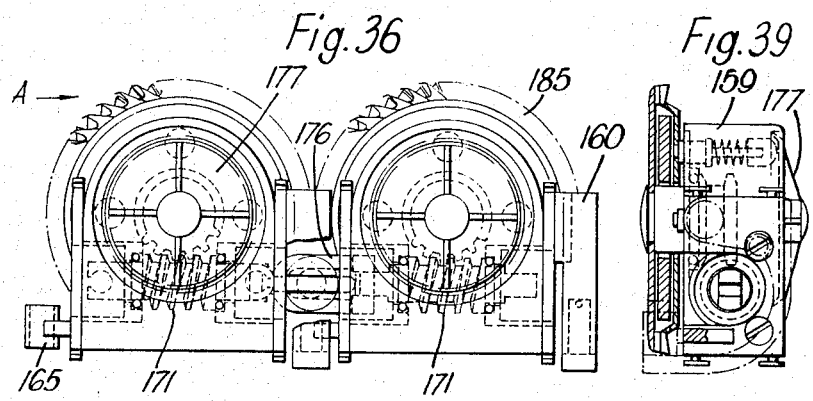
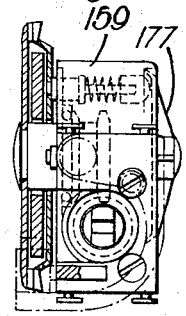
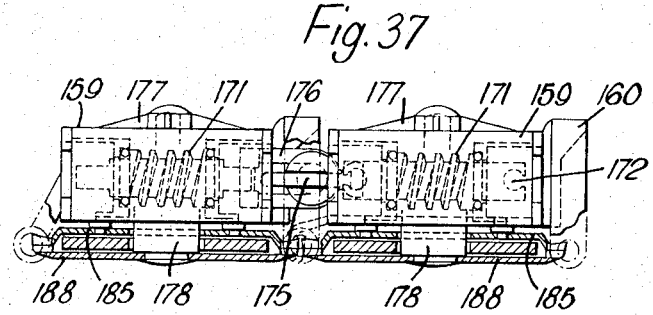
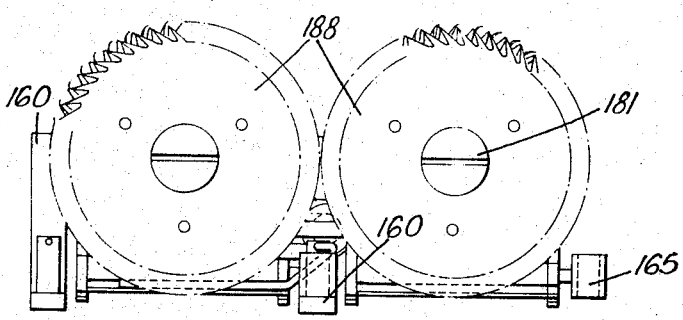
Inventor
ERWIN THIEL
By Young & Thompson
Attorneys

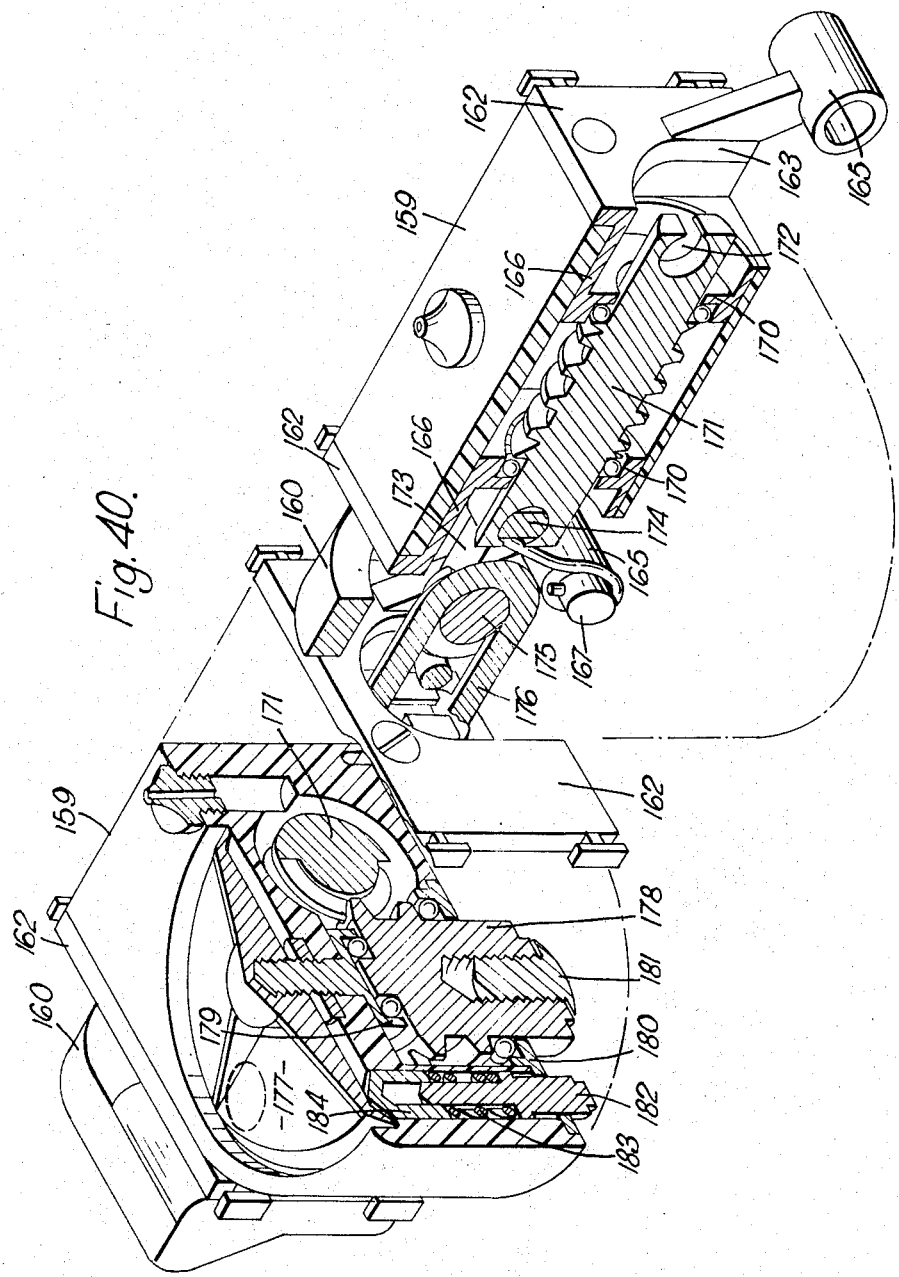

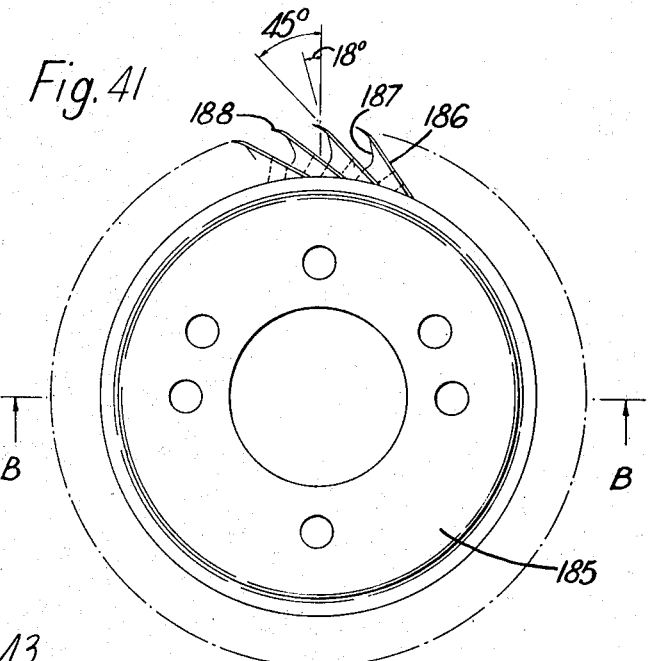
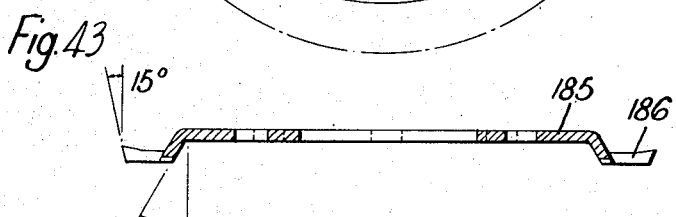
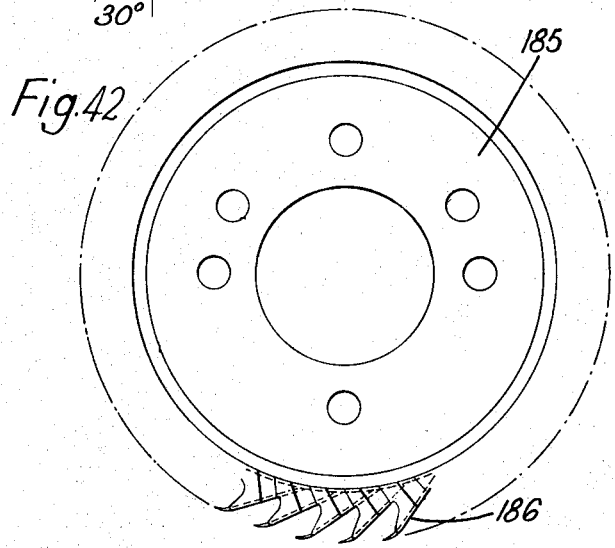

Jan. 9, 1968 E. THIEL 3,362,274
APPARATUS FOR SHEARING ANIMALS
Filed Aug. 9, 1965 24 Sheets-Sheet 22
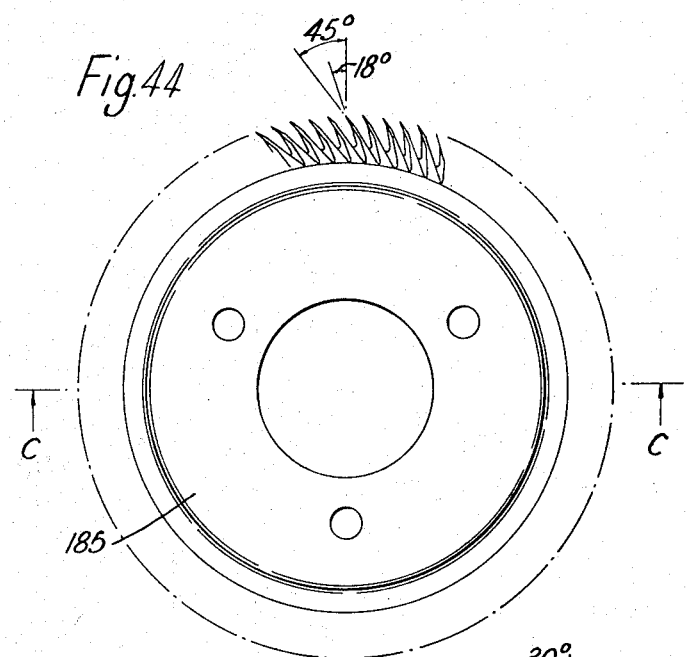
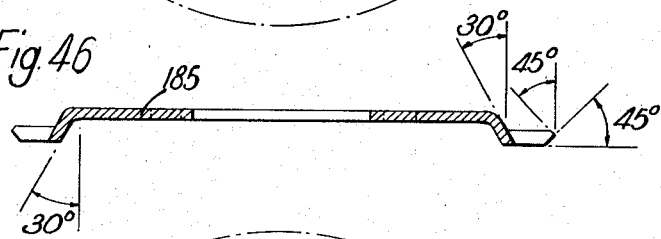
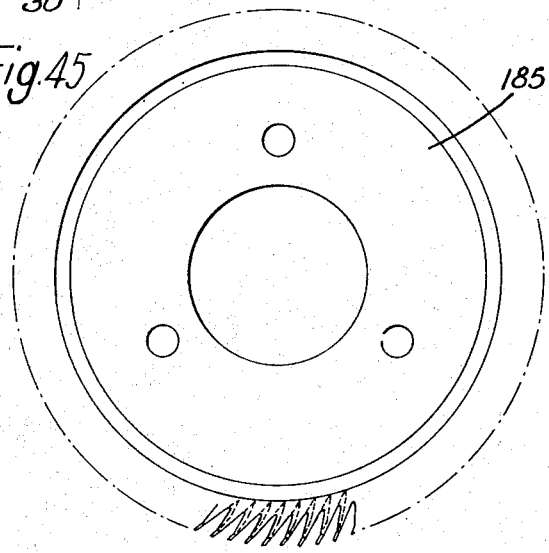
Inventor
ERWIN THIEL
By Young + Thompson
Attorneys Jan. 9, 1968           E. THIEL           3,362,274
APPARATUS FOR SHEARING ANIMALS
Filed Aug. 9, 1965           24 Sheets-Sheet 24
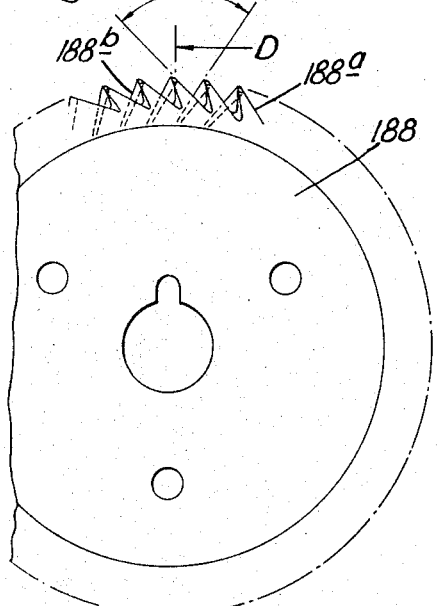
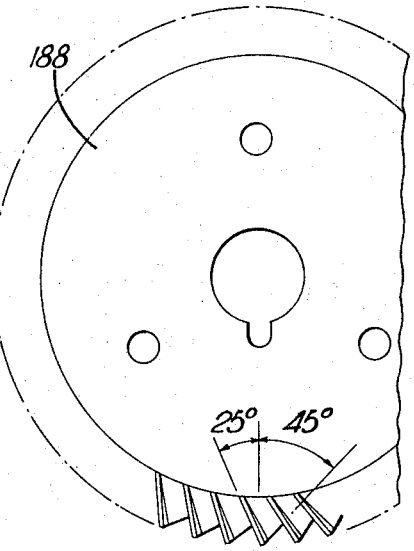
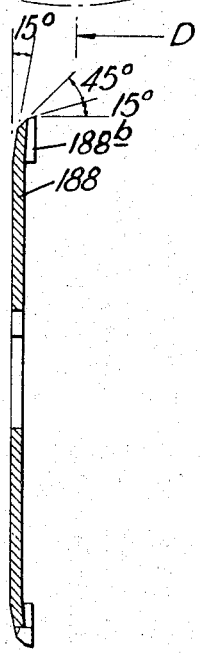
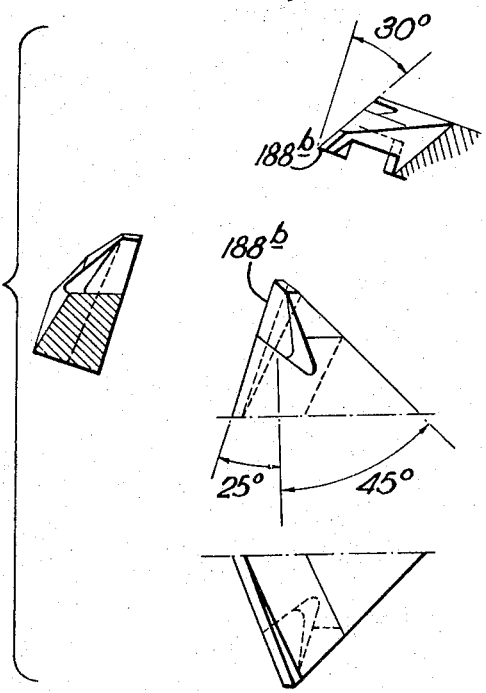
Inventor
ERWIN THIEL
By Young & Thompson
Attorneys United States Patent Office
3,362,274
Patented Jan. 9, 1968

3,362,274
APPARATUS FOR SHEARING ANIMALS
Erwin Thiel, 2 White Hall, Brookland, Kent, England
Filed Aug. 9, 1965, Ser. No. 478,126
Claims priority, application Great Britain,
Aug. 14, 1964, 33,266/64
10 Claims. (Cl. 83—675)

ABSTRACT OF THE DISCLOSURE

A sheepshearing machine comprises a plurality of rotatable cutter discs connected together chainwise in the form of a generally upright loop. The axes of rotation of the cutter discs are disposed in a common generally upright plane, and the loop is supported so that it can yieldably encompass a sheep's body while traversing and shearing it.

This invention relates to apparatus for shearing animals more particularly sheep.

According to the present invention a plurality of shearing devices are interconnected to form a flexible loop adapted to encircle the body of the sheep, the shearing devices being power operated and the loop being adapted to be moved along the body of the sheep, for example, from head to tail, so as to shear off its fleece, the loop automatically expanding or contracting to adapt itself to the varying contours of the sheep's body.

The shearing devices may be linked together in series by universal type couplings adapted to transmit power for operating the devices.

The loop may be supported by suitable means in a stall-like frame in which the sheep is held immobile, the loop being automatically operated to traverse over the body of the sheep from head to tail to shear off the fleece.

It will be understood that in passing over the narrower parts of the body such as the head and neck, the ends of the loop will overlap to produce a small intermediate loop portion encircling these narrow parts. As the wider parts of the body are reached the loop automatically expands and extends completely around the body so that the whole of the fleece is engaged and sheared by the devices.

The stall may include means manually or power operated when a sheep has been positioned therein to engage parts of the sheep to hold it immobilized during the shearing operation.

The invention also includes a power operated shearing device comprising a cutter head in which is mounted a cutter disc formed with peripheral cutters, the disc being rotatable relative to a stationary disc having a plurality of radially extending arms such that the fleece is cut by the co-operating action of the cutters rotating over the stationary arms.

The stationary disc is resiliently urged by springs against the cutter disc, and the outer face of the cutter disc, which is adapted to be in contact with the skin of the animal being sheared, has a series of equi-spaced tangentially disposed ribs so arranged that as the cutter disc rotates it will smooth out any folds or puckers in the skin which might otherwise tend to be nipped or cut by the cutters.

To enable the invention to be fully understood, it will now be described, by way of example, with reference to the accompanying drawings in which FIGURE 1 is a perspective view of an automatic shearing machine according to one embodiment of the invention;

FIGURE 9 is a side view of interconnected cutters which make up the loop;

FIGURE 10 shows details of the gearing;

FIGURE 11 shows plan and under plan views of the cutter discs and stationary combs;

FIGURE 12 is a further view of the cutters;

FIGURE 13 represents in side elevation another embodiment of sheep-shearing machine in accordance with the invention;

FIGURES 15 and 16 represent, in further enlargement, the cutter chain arrangement of FIGURE 14, respectively in front and side views;

FIGURE 17 represents in front view the cutter supporting frame and mechanism shown in FIGURE 14;

Figure 26:
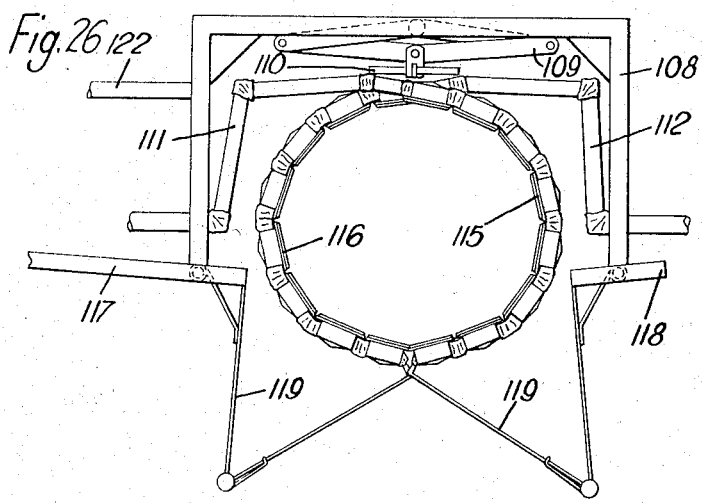
Figure 27:
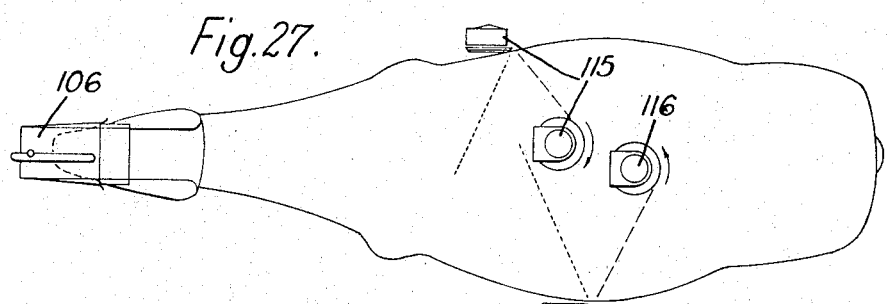
Figure 28:
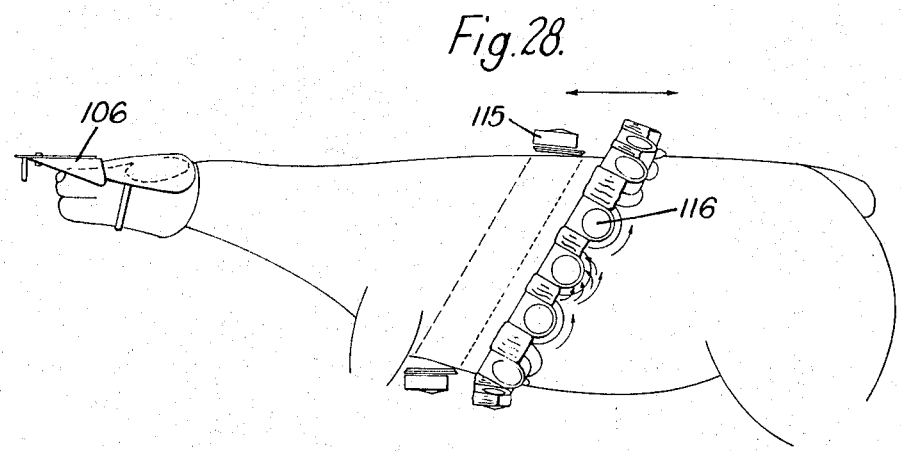
Figure 33:
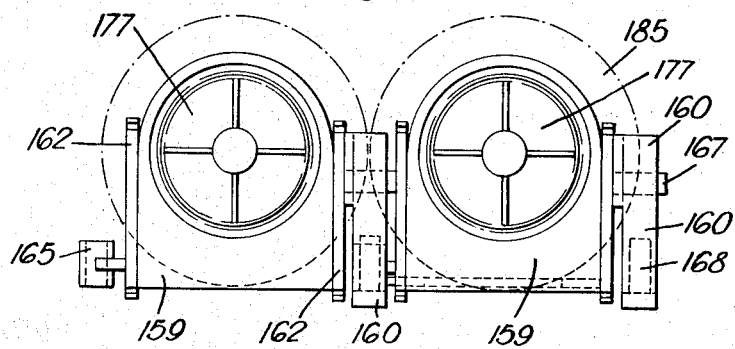
Figure 34:
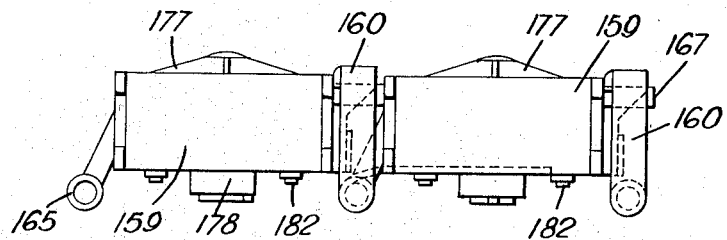
Figure 35:
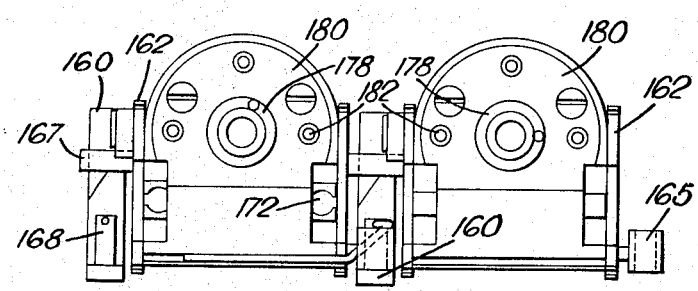
Figure 47:
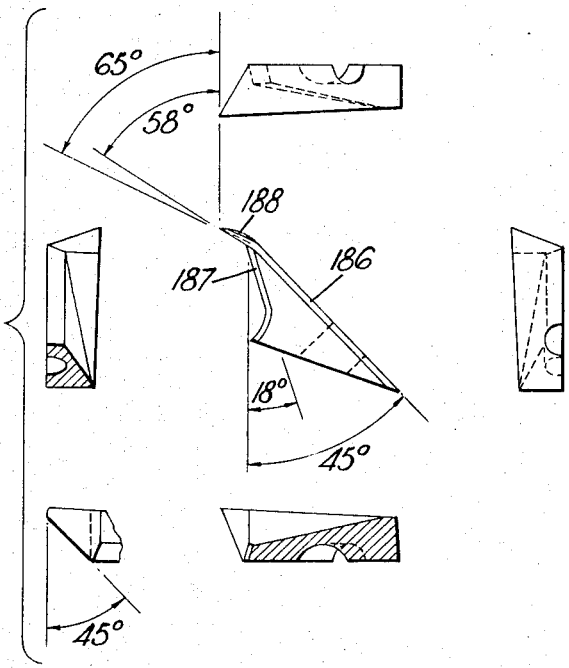
Figure 48:
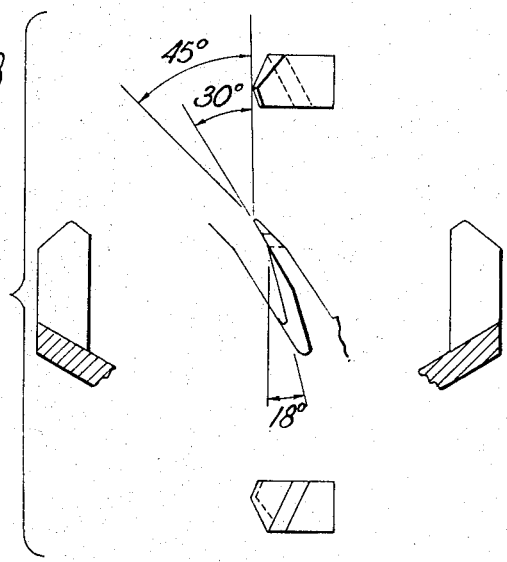

FIGURES 18 to 25 inclusive represent enlarged details of the frame and mechanism shown in FIGURE 17, FIGURES 18 and 19 being respectively front and plan views of means for cutter tension adjustment; FIGURES 20 and 21 being respectively front and plan views of the joints of the cutter tension leverages; FIGURES 22 and 23 being respectively front and side views of cutter raising and lowering lever arrangements; and FIGURES 24 and 25 being respectively front and plan views of spring tensioning means for the cutter supports;

FIGURE 26 represents the cutter arrangement when opened out during passage of a sheep's body;

FIGURES 27 and 28 represent respectively in plan and side view the way in which the cutter normally traverses a sheep's body during shearing;

FIGURES 29 and 30 represent respectively in side elevation and plan another form of sheep-shearing machine in accordance with the invention;

FIGURE 31 represents in perspective part of a chain of cutter mechanisms as seen in FIGURES 13–16;

FIGURE 32 represents in perspective, and somewhat enlarged, a link member used to connect together the units shown in FIGURE 31;

FIGURES 33, 34 and 35 represent respectively in top, side and underneath views two coupled mechanisms such as embodied in the chain shown in FIGURE 31;

FIGURES 36, 37 and 38 represent views similar to those respectively of FIGURES 33, 34 and 35, with the cutter discs fitted, and showing some of the internal mechanisms;

FIGURE 39 represents a side view, partly in section, of one of the cutter units looking in the direction of the arrow A in FIGURE 36;

FIGURE 40 represents an enlarged sectional perspective view of parts of two coupled cutter units such as shown in FIGURES 33–39;

FIGURES 41 and 42 represent respectively the outer face and inner face of a thirty-nine toothed shearplate for use in a cutter unit in accordance with the invention;

FIGURE 43 is a diametrical section of the shearplate along the line B—B of FIGURE 33;

FIGURES 44, 45 and 46 represent views similar to those of FIGURES 41–43, of an eighty-six toothed shearplate, the section of FIGURE 46 being taken along the line C—C of FIGURE 44;

FIGURES 47 and 48 represent enlarged views of a tooth respectively from FIGURES 41 and 44, in each case surrounded by side elevations of the tooth from four different directions;

FIGURES 49 and 50 represent respectively the outer and inner faces of a rotary cutter used in a cutting unit in accordance with the invention;

FIGURE 51 represents a section of the cutter along the diameter D—D of FIGURE 49;

FIGURE 52 represents an enlarged view of a tooth of the cutter shown in FIGURE 49, surrounded by side elevations from three different directions.

Figure 1:
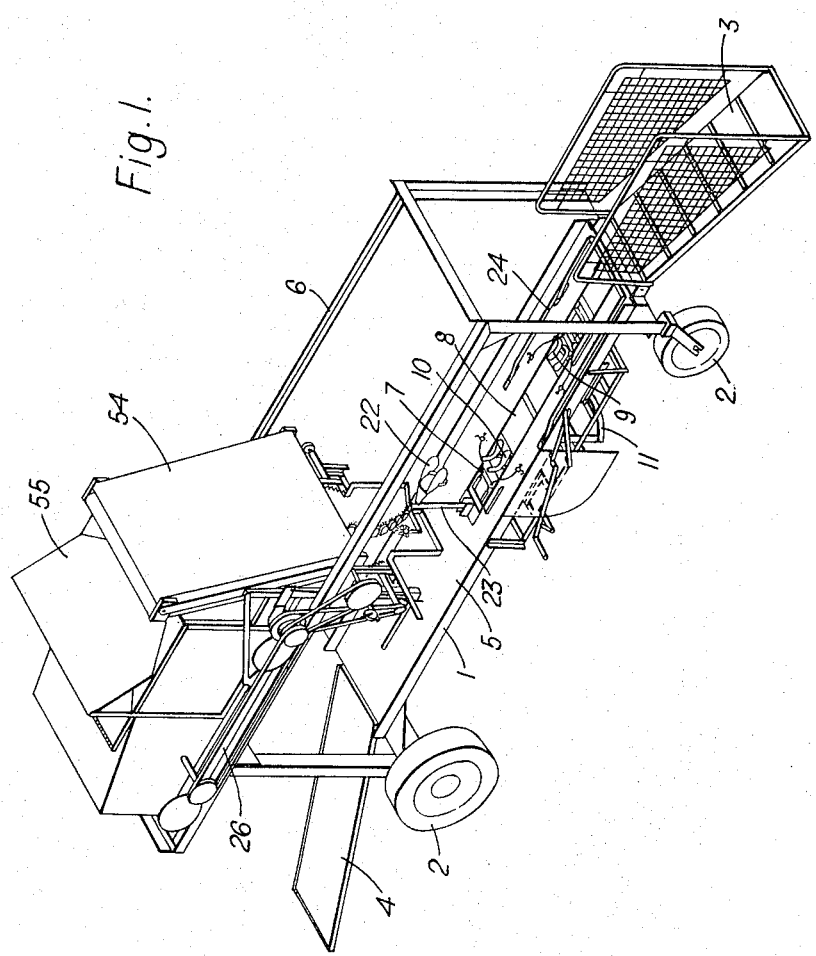
Figure 2:
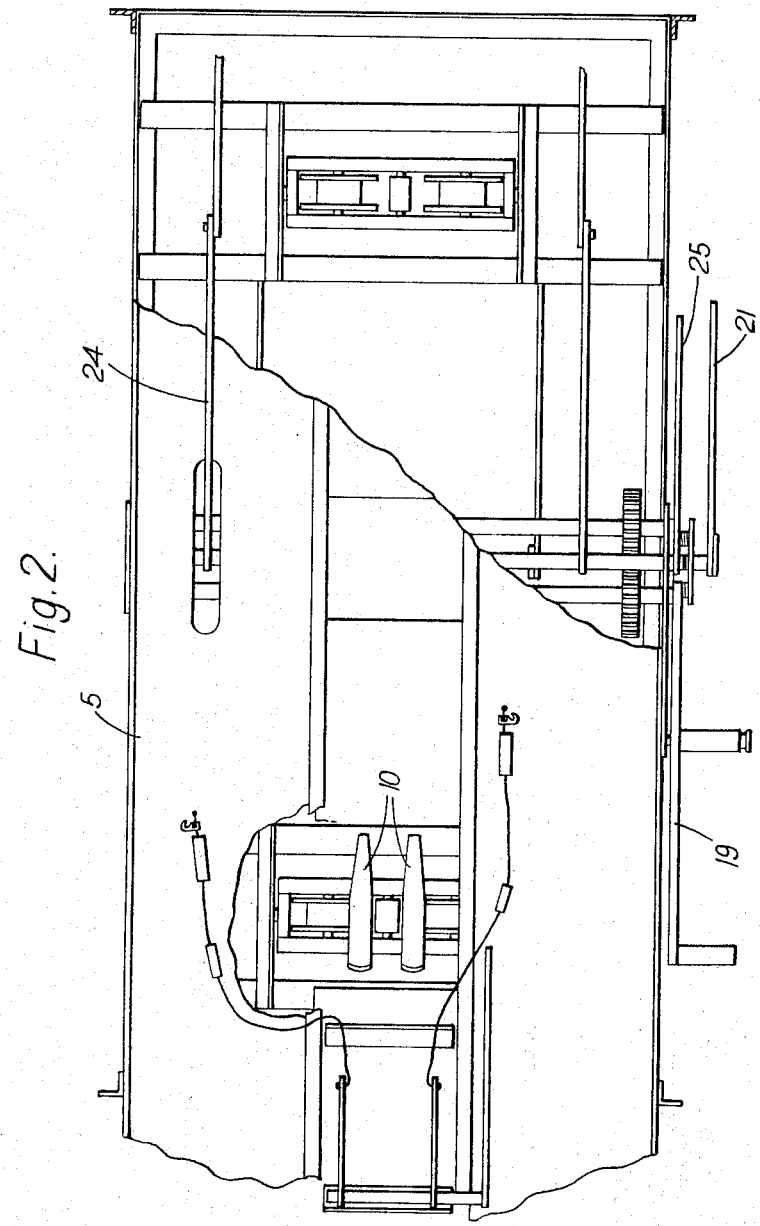
FIGURE 2 is a part plan view thereof.
Figure 3:
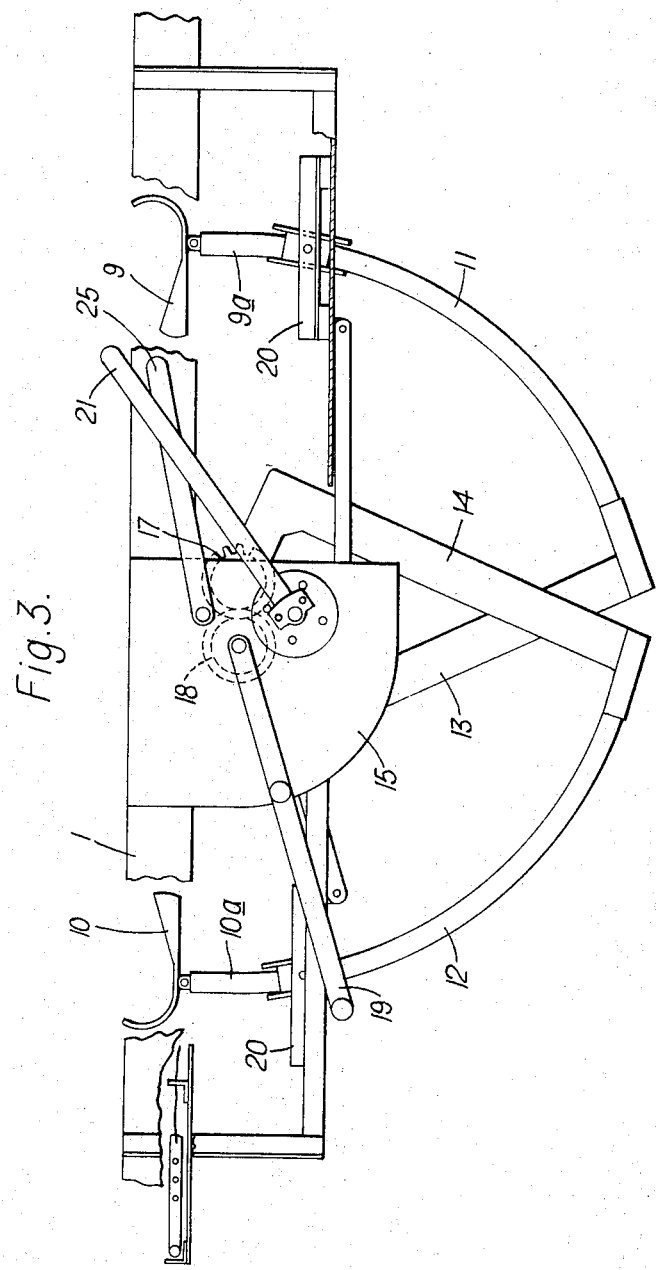
FIGURE 3 is a side view illustrating part of the mechanism shown in FIGURE 1.
Figure 4:
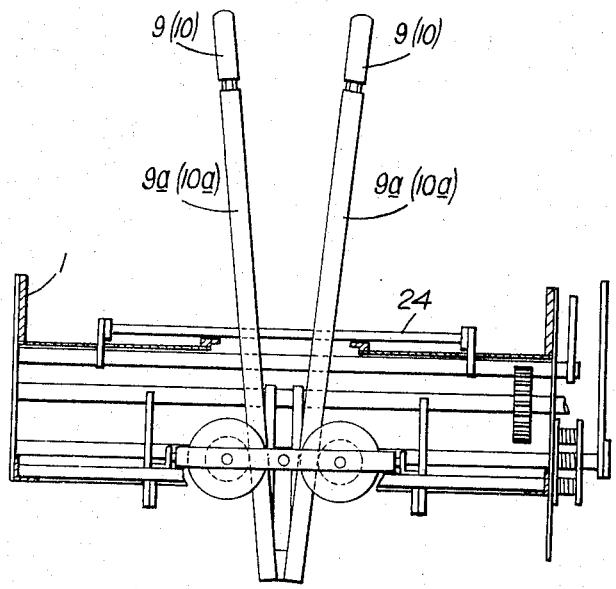
FIGURE 4 is a fragmentary sectional view.
Figure 5:
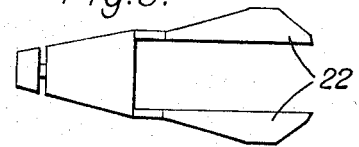
FIGURE 5 is a plan view of head members for the animal to be sheared.
Figure 6:
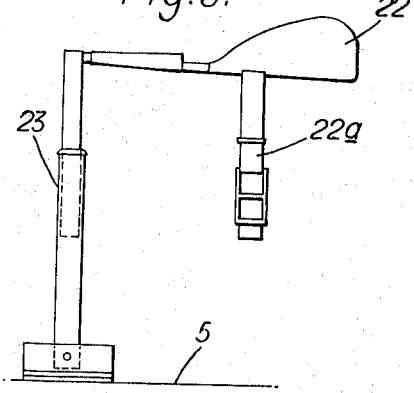
FIGURE 6 is a side view of FIGURE 5.

As shown in FIGURE 1 of the aforesaid drawings which illustrates a transportable shearing vehicle, the latter comprises a chassis 1 supported on wheels 2 and having an adjustable ramp 3, 4 at each end leading to a floor 5. An open frame structure generally indicated by 6 extends upwardly of the floor 5.

A central opening 7 is provided in the floor in which a sub-floor unit 8 is mounted. Adjacent opposite ends of the sub-floor 8 are provided pairs of crutch-like members 9, 10 supported on rods 9a, 10a connected to arcuate-shaped arms 11, 12 whose inner ends are connected to upwardly extending arms 13, 14 pivoted to a side plate 15 attached to the chassis 1.

A gear wheel 16, 17 is mounted on the end of each arm 13, 14 meshing with a gear wheel 18 on the end of a foot operated lever 19 such that downward movement of the lever will transmit a pivotal movement to the arms 13, 14 to effect an upward movement of the crutches 9, 10. The crutches are adapted to be retained in the upward position by slides 20 actuated by a hand lever 21.

Head engaging members 22 are also provided mounted on an adjustable rod 23, for engaging the head of the sheep.

A U-shaped frame 24 is pivoted to the floor and is raised and lowered by a hand lever 25.

A sheep to be sheared is driven up the ramp 3 onto the floor 5, and the lever 25 operated to raise the frame 24 so that it extends along the sides and rear of the sheep to prevent it retreating.

The head members are positioned on opposite sides of the animal's head and secured by the strap 22a. The lever 19 is then actuated and the crutches are raised to engage the body of the animal inside the fore and rear legs so that the animal is immobilised. The slides are moved into operative position to retain the crutches in raised position. The shearing unit is mounted on a carriage 26 movable longitudinally of the floor 5 and includes a cutter assembly indicated by 27 comprising a plurality of cutter units 28 interconnected in series to form a flexible loop. As shown, the loop comprises two series of cutters, those at one end of each series being connected to power shafts for rotating the cutter discs of the cutter units, the power shaft being housed in transmission tubes 29, 29a, 30, 30a, 31, 31a and being driven by pulleys 32, 32a.

The cutter assembly is adjustably suspended from part of the frame of the carriage 26 by a system of pivoted links 33, 33a, 34, 34a, the pivot point of the links 33, 33a being connected to a wire 35 which is wrapped round a pulley 36 which is rotatable by a handle 37 so that the height of the cutter assembly can be adjusted as required.

Figure 7:
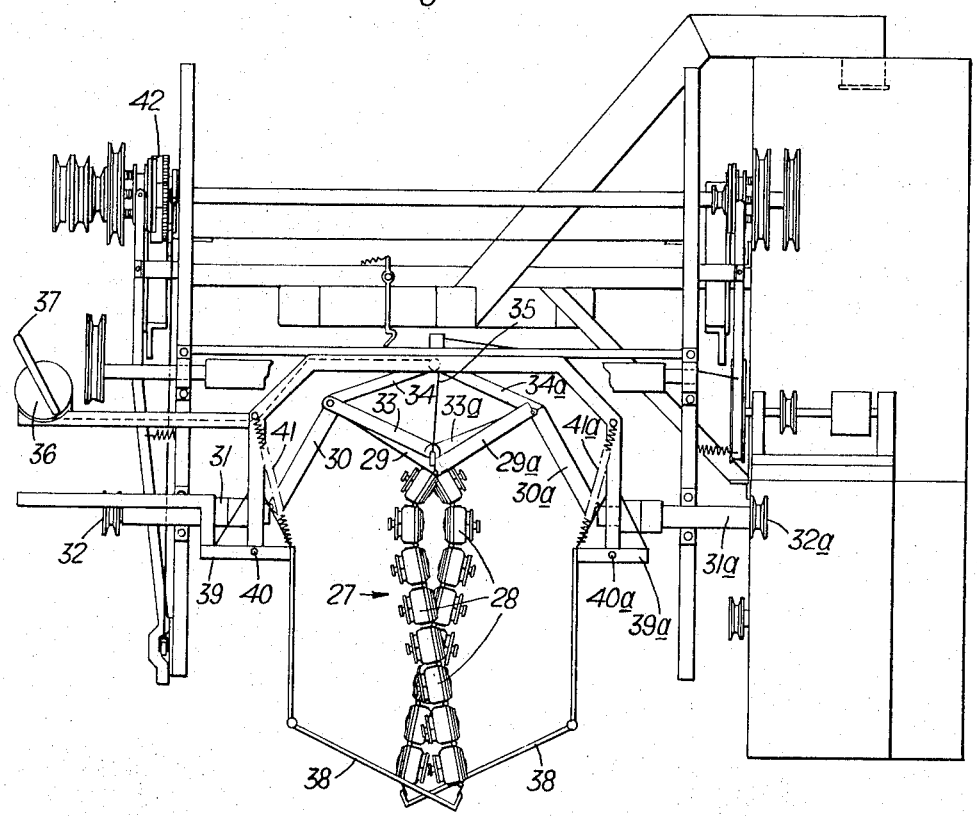
FIGURE 7 is a sectional view of FIGURE 1.
Figure 8:
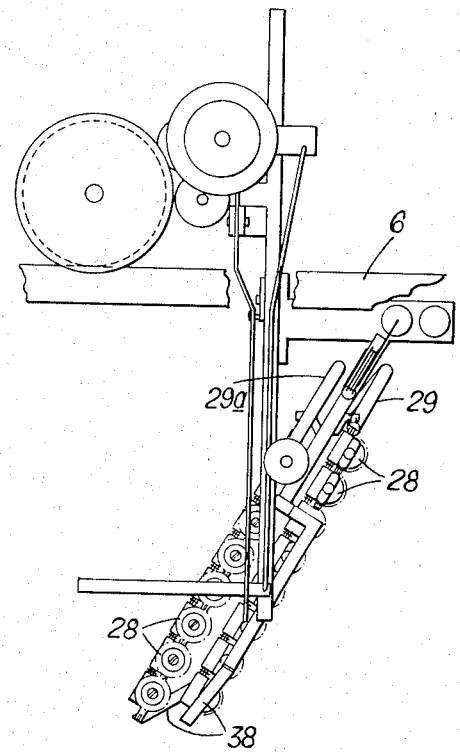
FIGURE 8 is a fragmentary side view of the loop of cutters.

The lower ends of the two series of cutters are respectively connected to frame members 38 supported by lateral levers 39, 39a pivoted at 40, 40a and connected to springs 41, 41a. By pivoting the levers 39, 39a, the lower ends of the series of cutters are moved apart to open up the loop. The springs 41, 41a tend to urge the cutters into the position indicated in the drawing (FIGURE 7).

The main transmission gearing for operating the carriage 26 is indicated by 42.

The cutter units are more particularly illustrated in FIGURES 9 to 11, and each unit comprises a casing 43 in which is mounted a shaft 43a carrying a rotary cutter disc 44 which includes a plurality of cutter blades 44a arranged on the periphery of the disc, the undersides of the blades have tangential ribs 45 for a purpose to be described. A stationary comb element 46 is mounted coaxially of the cutter disc and has radial fingers 47. The cutter disc rotates relatively to the comb element 46, the fleece being gathered between the radial fingers and sheared.

The under face of the cutter discs 44 will be in contact with the skin of the animal and the disc ribs 45 will tension the skin and smooth out any puckers so that there will be no danger of the skin being cut by the cutter blades.

As shown in FIGURE 9, the casings 43 are connected by hinges 48. Further, each casing houses a worm 49 meshing with a worm wheel 50 on the shaft 43a to effect the rotation of the shaft 43a to rotate the cutter discs which rotate at relatively slow speed. A coupling 51 connects the ends of the worms 49 of adjacent casings 43 so that by driving the end worm the cutter discs of all the cutter units will be simultaneously rotated.

Springs are provided resiliently urging the cutter disc 44 and the comb 46 together.

As shown, guide elements 52 are provided for each cutter unit and include tangential arms 53 so arranged that any part of the fleece between adjacent cutter discs will be guided into the path of one or other of the discs.

The operation of the apparatus is as follows:

The animal to be sheared is driven up the ramp 3 onto the floor 5 and the frame 24 raised into operative position. The head members 22 are fastened to the animal's head and the crutches 9, 10 raised so that the animal is immobilised as above described.

The carriage 26 is at the end of the floor 5 opposite to the ramp 3, and the loop of cutters is opened out to receive the neck of the animal. It will be noted that the springs 41, 41a will tend to draw the loop closed to keep the cutters against the animal's body.

The main drive is then engaged to operate the cutter units and move the carriage 26 forwardly so that the loop of cutters will traverse the body of the animal and expand or contract according to the varying contours of the animal, and as the carriage is progressively moved forwardly the whole of the fleece will automatically be sheared.

As the fleece is sheared it will be picked up by the conveyor 54 and delivered into a chest 55 mounted on the carriage 26 wherein it is wound into a ball by the action of the conveyor 56 and blades 57. Rotary arms 58 form pivots for winding the ball, the arms being adapted to be withdrawn laterally by levers 59 when a ball has been wound, so that it can be removed from the chest.

The form of sheep-shearing machine according to the invention shown in FIGURES 13–25 comprises a wheeled trailer having a base platform 100, with side frames 101, having a rear ramp 102, fitted with side fences 103, up which ramp a sheep can be driven onto the platform 100. The platform is fitted with crutch supports 104 adapted to be raised and lowered by means such as described above in order to support a sheep over the platform (FIGURE 13). A standard 105 on the platform carries a head mask 106 in which a sheep's head can be secured as shown in FIGURE 13.

A wheeled trolley 107 runs on the upper horizontal limbs of the side frames 101 of the platform, which form rails for it, and the trolley supports chains of cutters for shearing a sheep, conveyor means for lifting the sheared fleece, and a bale winder for packing the fleece into bales ready for transport. Details of the cutters and of the bale winder will be described more fully hereinafter, but the general arrangement can clearly be seen in FIGURES 13–17. In an inverted U-shaped gallows frame 108 suspended from the inner end of the trolley 107, to hang down between the side frames 101 of the platform 100, a lazy tongs linkage 109 has a crossbar 110 which at each end pivotally supports an arm of a flexible drive 111 or 112. As seen in FIGURE 17 each flexible drive comprises shaft sections connected together by universal joints, the free end of the first section of each drive being connected by a universal joint to a drive shaft 113 or 114 pivoted at the lower ends of the side limbs of the gallows frame 108. To the other end of each of the flexible drives 111 and 112 is detachably connected a chain 115 or 116 forms of a plurality of cutters connected together in series by flexible drive means.

Figure 14:
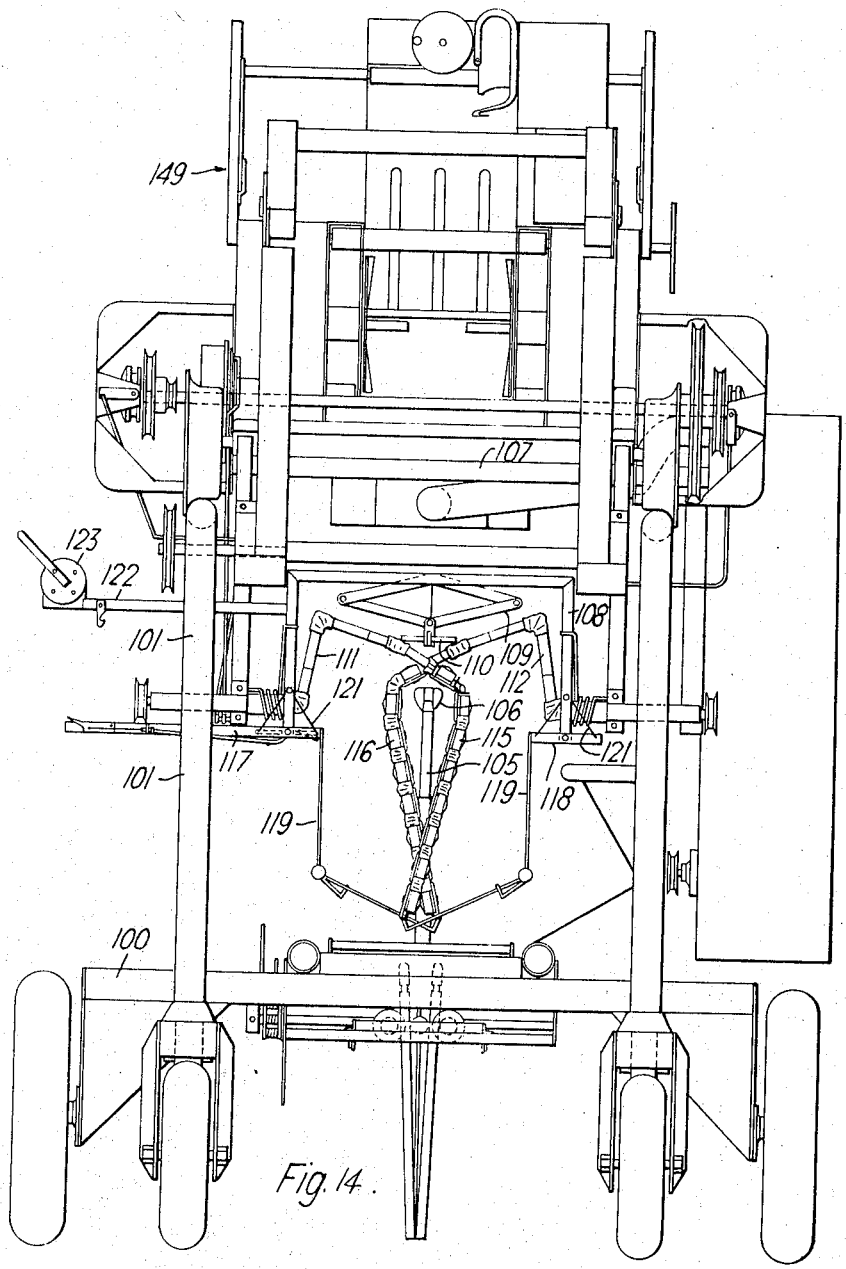
FIGURE 14 represents an enlarged end elevation of the machine shown in FIGURE 13 seen from the right-hand side.

At the lower end of each side limb of the gallows frame 108 is pivoted a rocking lever 117 or 118, one of these (lever 117 as shown) extending a substantial distance to one side of the equipment for easy manipulation. From the inner end of each rocker 117 and 118 hangs down a connector 119 formed of two pivoted sections the upper of which is rigidly secured to its associated rocker, and the lower of which is connected by its free, lower, end to the bottom of a cutter chain 115 or 116. As seen in FIGURES 14 and 15 the connector 119 supported at the lower end of each side limb of the frame 108 is connected to the lower end of the cutter chain supported by the flexible drive 111 or 112 suspended from the bottom of the opposite side limb of the frame 108. A rockable lever 120 on the shaft of the hand lever 117 is connected by two wires or cables 121, running from its opposite ends, to the ends of rocking lever 118. As seen in FIGURE 17 the wires or cables 121 are guided in the frame 108 which is preferably of hollow tube. The outer end of each lever 120, 118 is connected by wire or cable 121 to the inner end of the other lever, so that when lever 117 (and with it lever 120) is rocked in one sense, the lever 118, by the wires or cable 121, is rocked in the opposite sense. By this means the connectors 119 (and the ends of the cutter chains connected thereto) can be moved inwards or outwards simultaneously by operation of the hand lever 117. Because the connectors 119 overlap (FIGURES 15 and 17) the chains can also closely overlap (FIGURE 15), or can be widely opened out (FIGURE 26), or by swinging apart the connectors 119 can be completely separated at their lower ends.

A tube 122 secured to, and projecting laterally from, the gallows frame 108 carries a lever-actuated pulley 123 from which a wire or cable 124 runs through the tube 122, and at its other end is connected to the lower joint of the lazy tongs linkage 109. By rotation of the pulley 123 the cable 124 can be wound in or released to withdraw or extend the lazy tongs 109 and thus to raise or lower the cutter chains 115 and 116 supported on the crossbar 110 of the lazy tongs.

When a sheep is secured in position, as shown in FIGURE 13, the trolley is moved along the rails 101 from the forward towards the rear end of the trailer platform 100, and by appropriate operation of the pulley 123 and the lever 117 the cutter chains are brought to a suitable height, and opened apart appropriately to encircle and move over the sheep's body, during which time the cutters of the chains 115 and 116 shear off the fleece. It will be noted that the lower ends of the chains can be separated to pass the sheep's legs, and that owing to the flexibility of the chains, their drives 111 and 112, and their connectors 119, the chains are able to open apart, or close together, and to assume various curvatures in order to conform with the contours of the sheep's body and thus ensure a close fleece-shearing operation. The pulley 123 and the lever 117 are each provided with releasable catch means to hold them in any desired position.

Details of the mechanism described in general terms above are illustrated in FIGURES 18–25. In FIGURES 18 and 19 are shown the inner end of the lever 117 which is angled at 125, and connected by a spring 126 to the housing 127 for a shaft which supports springloaded arms 120a and 120b constituting the opposite halves of the lever 120 shown in FIGURE 17, which are connected to the wires or cable 121. An adjusting lever 128 allows variation of tension of the spring 126, being connected by a screw 129 to one or other of a series of spaced holes 130 in a fixed plate 131.

FIGURES 20 and 21 represent in side view and plan the spring joint between sections 132, 133 forming a connector 119. The section 133 is pivoted on a pin 134 secured to the section 132 and a spring 135 attached by one end to the pin 134 encircles the pin, and by its other end engages the section 133.

Details of the pulley 123 are shown in front and side elevation respectively in FIGURES 22 and 23. The pulley is pivoted on a plate 136, which is rigid with the end of the tube 122, by a bolt 137 about which is coiled a spring 138 connected by one end in a slot of the plate 136, and by its other end to a pin 139 movable into one or other of a series of holes 140 in the pulley 123 to adjust tension of the spring. The pin 139 may also secure the operating lever 141 to the pulley.

The rockable lever 118 shown in front elevation and plan respectively in FIGURES 24 and 25 is of U-shape transversely and is held by a pivot bolt 142 to the frame 108, to which is secured a sector plate 143 provided with a ring of spaced holes 144. On the bolt 142, between the lever 118 and the plate 143 is a loose sleeve 145 with a lever 146 rigid therewith. A spring 147 attached at one end to a downward extension of the lever 118 is coiled round the sleeve, and connected by its other end to the lever 146. The lever 146 can be held in any desired position by a screw 148 in one or other of the holes 144, allowing adjustment of tension of the spring 147.

The fleece winder referred to above as incorporated in a shearing machine in accordance with the invention will be described in detail hereinafter, but it may be noted from FIGURES 13 and 14 that the bale winder indicated generally by reference 149 is mounted on the trolley 107, moves thereon and derives power from transmission through the trolley mechanism. It may also be noted that fleece sheared from a sheep by the cutter chains 115, 116 is lifted by conveyor means, indicated generally at 150, and delivered to the fleece winder for forming into bales. (The conveyor means are not shown in FIGURE 14).

A modified form of shearing machine in accordance with the invention is illustrated in FIGURES 29 and 30. A lower horizontal conveyor 151 on adjustable legs 152, and having side rails 153 communicates with an upwardly inclined conveyor 154 supported on a wheeled trailer base frame 155, which also supports an upper horizontal platform 156. A sheep 157 placed on its back on the lower conveyor 151 is carried up by conveyor 154 to the platform 156, and in travelling from the conveyor 154 to the platform it passes beneath adjustable guard plates 158 which effectively prevent movement of the sheep's legs. Between the guard plates 158 is fitted an array of cutter chains 115, 116 substantially the same as described above with reference to FIGURES 13–16. When carried through the ring formed by these cutter chains the sheep's fleece is sheared off his body, and delivered to a bale winder, 149, which in this case is located beneath the cutter chains on the base 155. The sheep, on reaching the platform 156 on its back may slide down a chute (not shown) or is removed by one or more operators and placed on the ground on its feet.

Details of the abovementioned cutter chains, and the cutter units incorporated therein, are illustrated in FIGURES 31–52. A chain comprises a series of casings 159, each housing mechanism for driving a rotatable cutter disc, connected together in series by coupling links 160, which are each shielded by a removable flexible cover 161, e.g. of leather, when the chain is assembled.

Each casing 159 has a flat upper surface, a flat wall at one end and a semi-cylindrical wall at the other end, and the sides are closed by plates 162 having archway apertures 163 (FIGURE 31) and each having an integral inwardly projecting cylinder 166. The plate 162 on one side of a casing has a bracket extension 164 supporting a bearing 165. The plate 162 on the other side of the casing has a projecting cylindrical hub 167. The connecting link 160 comprises a C-shaped metal strip having at one end an inwardly projecting spindle 168, and at the other end a bored block 169. To couple two casings 159 together the spindle 168 of a link is fitted into the bearing 165 on one side of one casing, and the block 169 fitted on the hub 167 at the adjacent side of the next casing.

As seen in FIGURE 40 the cylindrical projections 166 of the plates fit into the sides of the casing 159 and are stepped at 170 to support balls serving as bearings for a worm shaft 171 formed at its ends with keyhole transverse slots 172. Loop members comprise U-shaped bodies with cross-limbs 174 which engage in the slots 172 of adjacent worm shafts, with the U-shaped bodies 175, 176 interlinked (FIGURE 40) to form a universal coupling. By this means all the worm shafts 171 are connected together in series so that when the end shaft 171 is driven (i.e. by the drives 111 or 112, FIGURE 17) all the shafts 171 are driven.

The top face of the casing 159 has a circular aperture in which is fitted a cover plate 177. A toothed cylinder 178 is supported between an upper bearing plate 179 held by a screw. A lower bearing plate 180 forming the base of the casing, and the teeth of this cylinder 178 are in mesh with the worm shaft 171. The lower end of the cylinder 178 is provided with a screw 181 engaging a screw-threaded socket, for attaching a cutting disc thereto. It will be seen that when a worm shaft 171 is driven it rotates the cylinder 178 and thus drives the cutter disc thereon. All cutter discs of a chain of interconnected cutters are driven at the same time and speed. Pins 182, adjustable, and loaded by springs 183, in slidable sockets 184 in the casing, project through the base 180, and locate and support a shear plate which cooperates with the cutter disc.

As previously mentioned a cutter in accordance with the invention comprises, fitted to each driving unit such as described above with reference to FIGURES 31–40, a shearplate and a cutter disc. The shearplate is the inner plate, being located by the lower ends of the pins 182 close to the casing base 180, and the rotatable cutter disc is in an outer position, fitted on and rotated by the cylinder 178. The shearplate and cutter disc are formed with edge teeth, and cooperation of the (rotatable) cutter teeth with the (stationary) shearplate teeth perform the shearing of fleece when the cutter is in operation.

Two forms of shearplate are shown in FIGURES 41–43 and FIGURES 44–46 respectively. A dished disc 185 is centrally apertured and provided with holes to receive pins 182, and at its edge is formed with teeth. The shearplate shown in FIGURES 41–43 may have thirty-nine teeth. The rear edge 186 of each tooth is at an angle of about 45° to the radius of the disc 185, and is relieved. The front edge of each tooth, constituting a cutting edge 187 is at an angle of about 18° to the radius of the disc 185. The free tip 188 of each tooth is inwardly inclined and provides a circumferential profile for the disc. The precise form of such a tooth is shown in FIGURE 47.

An alternative shearplate formed from a like disc 185 but having eighty-six teeth, is shown in FIGURES 44–46. In this case the angle with the disc radius of the rear edge, and the front cutting edge of each tooth is 18°. Details of the form of each tooth are shown in FIGURE 48.

A cutter disc suitable for use with either of the shearplates shown in FIGURES 41–43 or FIGURES 44–46 is shown in FIGURES 49–51, with details of a tooth illustrated in FIGURE 52. A disc 188 with a central keyed aperture may have forty-eight teeth or blades round its edge; the angle between the rear edge of each tooth, and the inturned cutting edge of the blade being about 80°, (FIGURE 49). At the rear of each tooth is a rib 188a which, as a result of rotational movement over a sheep's body during a fleece shearing operation, tautens the skin to remove wrinkles etc., and thus prevents cutting of the skin by the teeth.

From the above description it will be seen that the invention provides a very effective cutter unit for shearing fleece from sheep, and cutting the hair and coats of animals. The invention also provides a machine for shearing sheep using a plurality of cutters operating simultaneously.

It should be understood however, that the invention is not limited solely to the details of any of the forms of the invention described above, which may be varied and modified in order to meet any conditions and requirements encountered, without departing from the scope of the invention, as defined in the appended claims.

What I claim is:

1. A sheepshearing machine comprising a plurality of cutter units each comprising a rotatable cutter disc, means pivotally interconnecting the cutter units in at least one chain with the axis of rotation of each cutter disc perpendicular to its axes of pivotal interconnection, and means supporting the cutter units in the form of a generally upright loop whereby the loop of cutter units can substantially encompass a sheep's body and follow the curves and contours of the body while traversing and shearing it.

2. A machine as claimed in claim 1, and yieldable spring means urging the cutter units inwardly against a sheep's body while the units are traversing a sheep's body thereby to cause the cutter units to follow the curves and contours of the sheep's body.

3. A machine as claimed in claim 1, said loop of cutter units being comprised of two said chains of cutter units, means suspending said chains from their upper ends, and means connected to the lower end of each chain and independently movable to move said lower ends apart or together.

4. A machine as claimed in claim 1, and a frame, said loop being comprised of two said chains of cutter units suspended by their upper ends from said frame, and two lever means pivotally mounted on said frame, the lower ends of said chains of cutter units being connected each to one of said lever means.

5. A machine as claimed in claim 4, and manual adjustment means common to said lever means to manipulate said lever means simultaneously.

6. A machine as claimed in claim 1, and means for vertically adjusting the position of said loop.

7. A machine as claimed in claim 1, and a base, means for securing a sheep to said base, and means for effecting relative movement of said loop and said base thereby to cause the cutter units to traverse the body of the sheep and shear off the wool.

8. A machine as claimed in claim 1, and a base, a trolley on said base, means supporting said loop of cutter units on said trolley, means for securing a sheep to a portion of said base over which said trolley passes, and means for moving said trolley over the body of a sheep secured to the base so that the cutter units traverse the sheep's body and shear wool therefrom.

9. A machine as claimed in claim 1, comprising a base, means for supporting said loop of cutter units on said base, a trolley movable on said base adjacent said cutter units, and means for securing a sheep's body on said trolley so that when the trolley is moved on said base the wool on the sheep's body will encounter and be sheared off by the said cutter units.

10. A machine as claimed in claim 1, said axes of rotation being disposed in a generally upright common plane.

References Cited

UNITED STATES PATENTS

| | | | |
|---|---|---|---|
| 616,214 | 12/1898 | Underwood | 30—240 X |
| 1,551,647 | 9/1925 | Dyson | 30—240 X |
| 3,145,607 | 8/1964 | Geary | 83—701 X |

JAMES M. MEISTER, *Primary Examiner.*